United States Patent
Kalhan

(10) Patent No.: US 9,591,619 B2
(45) Date of Patent: Mar. 7, 2017

(54) ACKNOWLEDGMENT MESSAGING OVER REFERENCE SIGNALS

(71) Applicant: Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 1 day.

(21) Appl. No.: 14/400,399

(22) PCT Filed: May 23, 2013

(86) PCT No.: PCT/US2013/042511
§ 371 (c)(1),
(2) Date: Nov. 11, 2014

(87) PCT Pub. No.: WO2013/177455
PCT Pub. Date: Nov. 28, 2013

(65) Prior Publication Data
US 2015/0131556 A1 May 14, 2015

Related U.S. Application Data

(60) Provisional application No. 61/650,865, filed on May 23, 2012.

(51) Int. Cl.
*H04W 72/04* (2009.01)
*H04L 1/16* (2006.01)
(Continued)

(52) U.S. Cl.
CPC ...... *H04W 72/0406* (2013.01); *H04B 7/0413* (2013.01); *H04L 1/1607* (2013.01);
(Continued)

(58) Field of Classification Search
CPC ... H04L 5/0053; H04L 5/0055; H04L 1/1607; H04L 1/12–1/20; H04W 72/042;
(Continued)

(56) References Cited

U.S. PATENT DOCUMENTS 8,169,957 B2 * 5/2012 Damnjanovic ... H04W 52/0216
370/318
8,170,081 B2 5/2012 Forenza et al.
(Continued)

FOREIGN PATENT DOCUMENTS

EP 1 998 499 12/2008
WO 2010013961 A2 2/2010
(Continued)

OTHER PUBLICATIONS

Texas Instruments; "Comparison of Different ACK/NAK in CQI RS Transmission Schemes"; 3GPP Draft: R1-080189; Jan. 9, 2008; 3GPP Mobile Competence Centre, France.
(Continued)

*Primary Examiner* — Asad Nawaz
*Assistant Examiner* — Thomas R Cairns

(57) ABSTRACT

A first wireless communication device transmits a reference signal at a series of transmission times to transmit a plurality of reference signals over time. The first wireless communication device receives a communication signal from a second device. In response to determining at the first device that an acknowledgment response should be sent to the second device in response to the communication signal, the first wireless communication device applies a code to the reference signal for at least one of the transmission times of the series of transmission times. The resulting coded reference signal indicates an acknowledgment response to the second wireless communication device.

12 Claims, 7 Drawing Sheets

(51) Int. Cl.
*H04W 76/02* (2009.01)
*H04L 5/00* (2006.01)
*H04W 4/00* (2009.01)
*H04W 72/06* (2009.01)
*H04B 7/04* (2006.01)
*H04W 72/08* (2009.01)

(52) U.S. Cl.
CPC .......... *H04L 5/0055* (2013.01); *H04W 4/005* (2013.01); *H04W 72/06* (2013.01); *H04W 76/023* (2013.01); *H04W 72/085* (2013.01)

(58) Field of Classification Search
CPC ..... H04W 72/04; H04W 72/06; H04W 4/005; H04W 73/023; H04W 72/0406; H04W 72/85; H04B 7/0413
USPC .......................................................... 370/329
See application file for complete search history.

(56) References Cited

U.S. PATENT DOCUMENTS

| | | | |
|---|---|---|---|
| 8,493,887 B2* | 7/2013 | Palanki | H04W 76/023 370/254 |
| 8,504,052 B2 | 8/2013 | Hakola et al. | |
| 8,942,192 B2 | 1/2015 | Damnjanovic et al. | |
| 9,084,241 B2 | 7/2015 | Madan et al. | |
| 9,143,275 B2* | 9/2015 | Li | H04L 1/0061 |
| 2009/0022098 A1 | 1/2009 | Novak et al. | |
| 2009/0042558 A1* | 2/2009 | Shen | H04L 1/0028 455/422.1 |
| 2009/0110038 A1* | 4/2009 | Montojo | H04L 1/003 375/211 |
| 2010/0165882 A1 | 7/2010 | Palanki et al. | |
| 2012/0093098 A1 | 4/2012 | Charbit et al. | |
| 2012/0106517 A1* | 5/2012 | Charbit | H04W 72/04 370/336 |
| 2014/0056213 A1 | 2/2014 | Goto et al. | |
| 2014/0057670 A1 | 2/2014 | Lim et al. | |
| 2014/0094183 A1 | 4/2014 | Gao et al. | |

FOREIGN PATENT DOCUMENTS

| | | |
|---|---|---|
| WO | 2010082114 A1 | 7/2010 |
| WO | WO 2011-109941 | 9/2011 |
| WO | WO 2011-132908 | 10/2011 |
| WO | 2011156638 A2 | 12/2011 |

OTHER PUBLICATIONS

TD Tech; "Some Considerations on Bundled and Multiplexing ACK Transmission in TDD"; 3GPP Draft: R1-081940; May 2008; 3GPP Mobile Competence Centre, France.

* cited by examiner

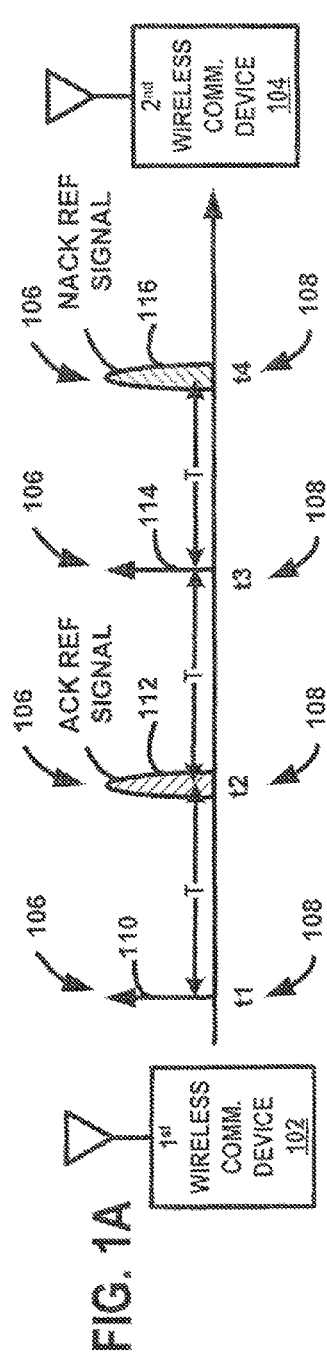
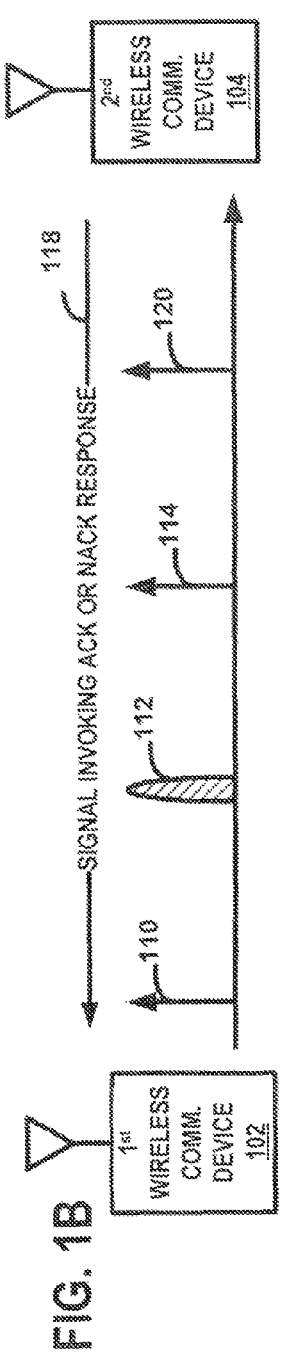
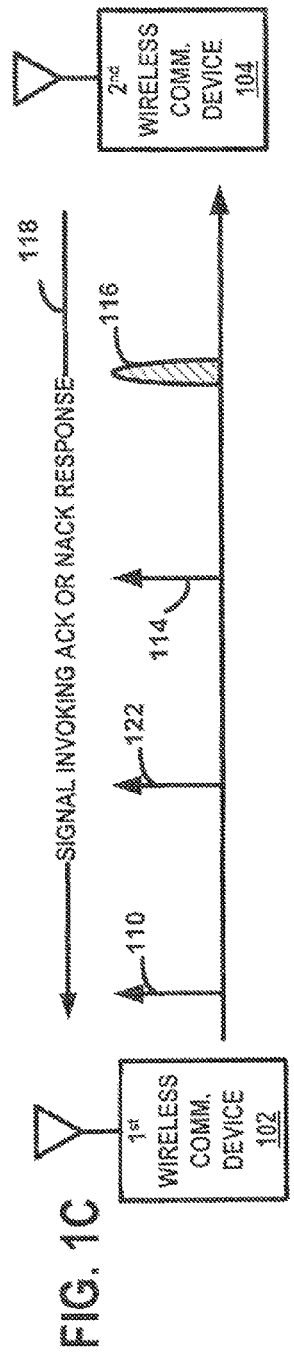
FIG. 1A
FIG. 1B
FIG. 1C

ACKNOWLEDGMENT MESSAGING OVER REFERENCE SIGNALS

RELATED APPLICATIONS

The present application is related to PCT Patent Applications entitled "MANAGEMENT OF DEVICE-TO-DEVICE COMMUNICATION RESOURCES USING CHANNEL SYMMETRY," and "TRANSMISSION OF DEVICE-TO-DEVICE (D2D) CONTROL DATA FROM A FIRST D2D DEVICE TO A SECOND D2D DEVICE IN A CELLULAR COMMUNICATION SYSTEM," both filed concurrently on May 23, 2013 with this application, assigned to the assignee hereof and hereby expressly incorporated by reference in its entirety.

FIELD

This invention generally relates to wireless communications and more particularly to acknowledgment messaging over reference signals.

BACKGROUND

Wireless communications often require one device to provide an acknowledgment response to another device. The acknowledgment response may be a positive or negative acknowledgment response. Typically, a positive acknowledgment response is referred to as an ACK and a negative acknowledgment response is referred to as a NACK or NAK. System design, protocols, standards, or other requirements dictate when wireless communication device should respond with an acknowledgment. The acknowledgment typically indicates whether a communication signal was successfully received and processed (decoded and demodulated) by the wireless communication device receiving the communication signal, although the acknowledgment may also indicate other information in some circumstances. Some examples of other information include indications of whether the first wireless communication device is ready or prepared for a next step in the communication session and whether the first wireless communication device is available. In conventional systems, devices typically provide an acknowledgment using a control channel. In some systems, a NACK indicates a need for re-transmission of the next coded symbols sob-block or a need to repeat the last coded symbols block. The ACK/NACK signal is typically 1-bit of information transmitted using a BPSK symbol and repeated several times for robustness.

SUMMARY

A first wireless communication device transmits a reference signal at a series of transmission times to transmit a plurality of reference signals over time. The first wireless communication device receives a communication signal from a second device. In response to determining at the first device that an acknowledgment response should be sent to the second device in response to the communication signal, the first wireless communication device applies a code to the reference signal for at least one of the transmission times of the series of transmission times. The resulting coded reference signal indicates an acknowledgment response to the second wireless communication device.

BRIEF DESCRIPTION OF THE DRAWINGS

FIG. 1A is a block diagram of a series of reference signals transmitted over time from a first wireless communication device to a second wireless communication device.

FIG. 1B is a block diagram of a series of reference signals including an ACK reference signal transmitted from a first wireless communication device to a second wireless communication device.

FIG. 1C is a block diagram of a series of reference signals including a NACK reference signal transmitted from a first wireless communication device to a second wireless communication device.

DETAILED DESCRIPTION

Figure 2:
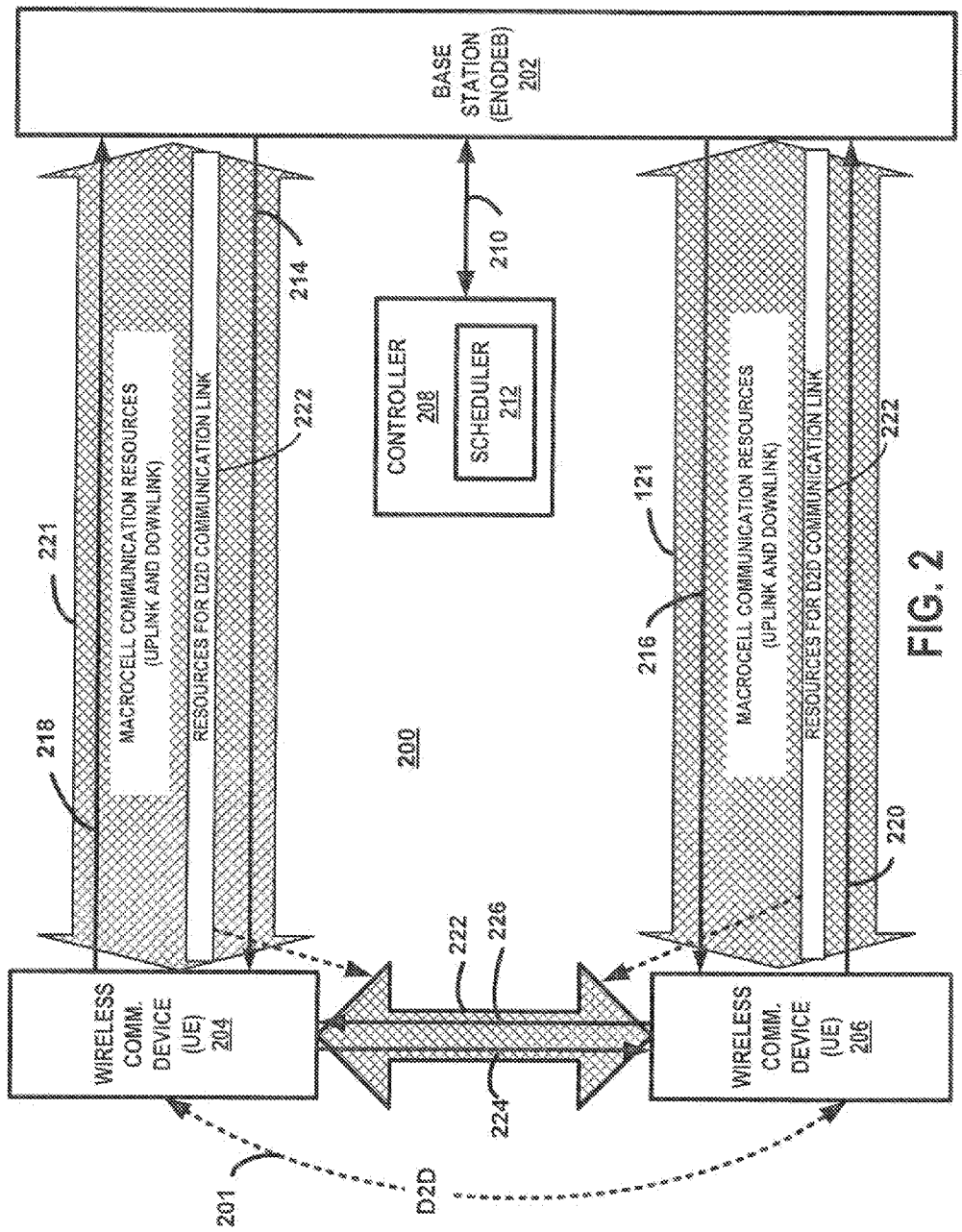
FIG. 2 is a block diagram of an example of a communication system where macrocell communication resources are used for communication with wireless communication devices to establish the device-to-device (D2D) communication link between wireless communication devices.

FIG. 1A is block diagram of a series of reference signals transmitted over time from a first wireless communication device 102 to a second wireless communication device 104. A reference signal 106 is transmitted at a series of transmission times 108 to transmit a plurality of reference signals 110, 112, 114, 116 over time. The transmission times 108 are designated such that both wireless communication devices are aware of the timing. For the examples herein, the reference signal is transmitted periodically at set time interval (T) between transmissions. Other transmission timings, however, can be used. In some circumstances, different devices may use different time periods based on multiples of a time period. In implementations where several devices are transmitting reference signals, the communication resources allocated for reference signal transmission from each device are assigned to minimize collisions and interference with other devices.

As is known, reference signals can be used for device detection/discovery, synchronization, channel estimation, and signal acquisition. In the examples discussed herein, however, a reference signal can be coded to convey acknowledgment responses. Wireless communications often require one device to provide a positive or negative acknowledgment response. Typically, a positive acknowledgment response is referred to as an ACK and a negative acknowledgment response is referred to as a NACK. For the examples herein, a device transmitting reference signals codes, or otherwise manipulates, the reference signal for at least one of the reference signal transmission times to provide an acknowledgment response. Therefore, in addition to transmitting conventional reference signals, the first device can also transmit an ACK reference signal 112 indicating a positive acknowledgment and a NACK reference signal 116 indicating a negative acknowledgment.

Conventional reference signals are un-coded or include coding known to devices that are receiving the reference signals. For example, conventional reference signals may be scrambled by a device identifier (ID), such as phone number, of the device transmitting the reference signal. Other devices receiving the reference signal are aware of the device ID and apply the device ID to receive the reference signal. For the examples herein, additional coding is applied to some of the reference signals to convey information to other devices receiving the reference signal. For example, one code may correspond to an ACK and another code may correspond to a NACK. Different techniques may be used to apply the codes where some examples include scrambling and modulation techniques. One example of coding using an exclusive-or (XOR) function to generate a scrambling code for scrambling the reference signal is discussed in further detail below. FIG. 1B is a block diagram of a series of reference signals including an ACK reference signal 112 transmitted from a first wireless communication device 102 to a second wireless communication device 104. FIG. 1C is a block diagram of a series of reference signals including a NACK reference signal 116 transmitted from a first wireless communication device 102 to a second wireless communication device 104. For the examples of FIG. 1B and FIG. 1C, the second wireless communication device 104 transmits a communication signal 118 to the first wireless communication device 102. The communication signal 118 can be a signal transmitted during a communication session between the two devices 102, 104. System design, protocols, standards, or other requirements dictate that the first wireless communication device 102 respond with an acknowledgment. The acknowledgment typically indicates whether the communication signal was successfully received and processed by the first wireless communication device 102, although the acknowledgment may also indicate other information in some circumstances. Some examples of other information include indications of whether the first wireless communication device is ready or prepared for a next step in the communication session and whether the first wireless communication device is available. In conventional systems, devices typically provide an acknowledgment using a control channel. For the examples herein, however, the use of communication resources is reduced since an existing scheduled transmission is exploited and no additional resources are used to transmit the acknowledgment response. Also, NACK indicates a need for re-transmission of the next coded symbols sub-block or a need to repeat the last coded symbols block.

For the examples of FIG. 1B and FIG. 1C, the reference signals 110, 114, 120, 122 do not include additional coding for conveying acknowledgment responses. Reference signals 110, 114, 120, 122 are coded using a code derived from the device ID. In FIG. 1B, the first wireless communication device codes the reference signal with a positive acknowledgment (ACK) code for one for the transmissions of the reference signal to generate a positive acknowledgment response (ACK) to the second wireless communication device 104. For the example, the time period selected for the acknowledgment response is the first transmission time after receipt of the communication signal 118. The communication signal 118 is received by the first wireless communication device between the transmission of the reference signal 110 at transmission time t1 and transmission time t2. Other timings can be used. In FIG. 1C, the first wireless communication device codes the reference signal with a negative acknowledgment (NACK) code for one of the transmissions of the reference signal 106 to generate a negative acknowledgment response (NACK) to the second wireless communication device 104. For the example, the time period selected for the acknowledgment response is the first transmission time after receipt of the communication signal 118. In FIG. 1C, the communication signal 118 is received by the first wireless communication device between the transmission of the reference signal 114 at transmission time t3 and transmission time t4. Other timings can be used.

The reference signal acknowledgment method may be used in a variety of different types of communication systems and devices. In one example, the first wireless communication device may be a base station, eNodeB (eNB), access point or other transceiver station connected to a core network. The second wireless communication device may be a portable or mobile user device such as wireless phone or user equipment (UE) device. In another example, the first wireless communication device 102 may be a portable of mobile user device and the second wireless communication device may be a transceiver station connected to a core network such as base station, eNB, etc.

The techniques discussed herein may be particularly useful in device-to-device (D2D) systems. Such systems may include a macrocell communication system where the user devices (UEs) can communicate directly with each other under the appropriate situations. The use of acknowledgment reference signals in such systems may reduce interference and the use of valuable communication resources since additional resources are not assigned for acknowledgment messaging.

For one example of D2D supported system, the communication system utilizes macrocell communication resources for communication between base stations (eNodeBs, eNBs) and wireless communication user equipment devices (UEs). The macrocell communication resources include downlink communication resources for downlink communication from a base station to wireless communication user equipment (UE) devices and uplink communication resources for uplink transmissions from the UE devices to the base station. The uplink communication resources are different from the downlink communication resources. Some of the macrocell communication resources are assigned to device-to-device (D2D) communication between two UE devices as needed. The downlink communication resources assigned for D2D communication are not used for downlink communication. For example, if the communication resources are time-frequency communication resources, the time segments and frequency bands (e.g., sub-carriers) assigned to the D2D communication fink are not used by the base station, if uplink communication resources are assigned for D2D communication, the resources are assigned such that interference to other D2D communication and to uplink communication in adjacent cells, as well as the same cell, is minimized. Examples of suitable techniques for managing macrocell resources for D2D communication are discussed in Patent Application Serial Number PCT/US2012/064711, entitled "DEVICE TO DEVICE COMMUNICATION MANAGEMENT USING MACROCELL COMMUNICATION RESOURCES," filed on Nov. 12, 2012, and incorporated by reference in its entirety herein.

FIG. 2 is a block diagram of an example of a communication system 200 where macrocell communication resources are used for communication with wireless communication devices to establish the device-to-device (D2D) communication link 201 between wireless communication devices. A relationship between macrocell communication resources and the D2D communication link is shown in FIG. 1B. The base station 202 provides wireless communication services to wireless communication user equipment (UE) devices 204, 206 within a geographical service area, sometimes referred to as a cell. Accordingly, the UE devices 204 are examples of the wireless communication devices 102, 104 discussed above. Several base stations are typically interconnected through a backhaul 210 to provide several service areas to cover large areas. The various functions and operations of the blocks described with reference to the communication system 200 may be implemented in any number of devices, circuits, or elements. Two or more of the functional blocks may be integrated in a single device, and the functions described as performed in any single device may be implemented over several devices. For example, at least some of the functions of the controller 108 may be performed by the base stations 202 and vice versa. A cellular communication system is typically required to adhere to a communication standard or specification. The Third-Generation Partnership Project Long-Term Evolution (3GPP LTE) communication specification is a specification for systems where base stations (eNodeBs) provide service to wireless communication devices (user equipment (UE) devices) using orthogonal frequency-division multiplexing (OFDM) on the downlink and single-carrier frequency-division multiple access (SC-FDMA) on the uplink. Although the techniques described herein may be applied in other types of communication systems, the exemplary systems discussed herein operate in accordance with a 3GPP LTE communication specification.

The base station 202 is a fixed transceiver station, sometimes referred to as an eNodeB or eNB, which may include a controller in some circumstances. The base station 202 is connected to a controller 208 through a backhaul 210 which may include any combination of wired, optical, and/or wireless communication channels. For the examples herein, the controller 208 includes the functionality of the Mobility Management Entity (MME) and the Packet Gateway (P-GW) in a 3GPP LTE communication system. Accordingly, the controller 208 includes a scheduler 212. In the example, the scheduler 212 allocates time-frequency resources for D2D communication between the wireless communication devices 204, 206 and for macrocell communication between the base station 202 and the wireless communication devices 204, 206.

The wireless (UE) communication devices 204, 206 may be referred to as mobile devices, wireless devices, wireless communication devices, and mobile wireless devices, UEs, UE devices as well as by other terms. The wireless communication UE devices 204, 206 include electronics and code for communicating with base stations and with other wireless communication devices in D2D configurations. The wireless communication devices include devices such as cell phones, personal digital assistants (PDAs), wireless modem cards, wireless modems, televisions with wireless communication electronics, and laptop and desktop computers as well as other devices. The combination of wireless communication electronics with an electronic device, therefore, may form a wireless communication device 204. For example, a wireless communication device may include a wireless modem connected to an appliance, computer, or television.

The base station 202 includes a wireless transceiver that exchanges wireless signals 214, 216, 218, 220 with the wireless communication devices 204, 206. Transmissions from the base stations and from the wireless communication devices 204, 206 are governed by a communication specification that defines signaling, protocols, and parameters of the transmission. The communication specification may provide strict rules for communication and may also provide general requirements where specific implementations may vary while still adhering to the communication specification. Although the discussion below is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical downlink control channels from a base station to a wireless communication device.

The macrocell communication resources 221 are used for transmitting the downlink signals 214, 216 and the uplink signals 218, 220. The base station 202 transmits downlink signals 214, 216 to the wireless communication devices 204, 206 using scheduled downlink communication resources of the defined downlink communication resources defined by the communication specification and reserved for downlink communication. The wireless communication devices transmit uplink signals 218, 220 to the base station using scheduled uplink communication resources of the defined uplink communication resources defined by the communication specification and reserved for uplink communication. The macrocell communication resources 221 include frequency bands divided in time where each frequency band and segment of time can be identified by the scheduler 212 and described in control signals sent from the base station 202 to the wireless communication devices 204, 206. The communication specifications, or other system rules, therefore, define applicable communication resources for the downlink and applicable communication resources for the uplink. The scheduler 212 allocates different time-frequency resources to different devices to efficiently utilize the resources while minimizing interference. Accordingly, the scheduled macrocell communication resources used for signals 214, 218 exchanged with one wireless communication device 204 are different from scheduled macrocell communication resources used for other signals 216, 220 exchanged with other wireless communication devices 108. As referred to herein, therefore, the macrocell communication resources 221 are the communication resources reserved for communication by the specification and/or communication system rules. The scheduled resources for transmission for particular signals, however, are a subset of the reserved macrocell communication resources 221.

Some of the defined macrocell communication resources are assigned (scheduled) for D2D communication. This portion (222) of defined macrocell communication resources 221, referred to as D2D communication resources 222, is typically scheduled dynamically as needed and based on channel conditions as well as other criteria. The scheduler 212, therefore, may assign either defined macro-cell downlink communication resources, defined macrocell uplink communication resources, or both for D2D communication.

In certain situations, it may be desirable for the wireless communication device to communicate directly over a D2D communication link instead of through base stations. During D2D communication, the first wireless communication device 204 transmits first D2D signals 224 to the second wireless communication device 206, and the second wireless communication device 206 transmits second D2D signals 226 to the first wireless communication device 204. In some situations, the D2D transmission may only be in one direction. For example, a D2D link may be established from a laptop to a display where only the laptop transmits signals to the display for broadcasting, streaming and other purposes. Some advantages of D2D communication include reduced interference within a cell and reduced battery consumption at the wireless communication devices. For example, when the D2D wireless communication devices are close to each other, the transmission power level can be significantly lower than would be necessary for transmission to the macrocell base station. As a result, the lower power signals cause less interference in the cell. The lower transmission power also results in less battery consumption.

For efficient D2D communications, the wireless communication devices typically must be close to each other. Since many wireless communication devices are mobile, the distance between any two devices changes. As a result, either the network or one of the wireless communication devices must determine that the wireless communication devices are sufficiently close for D2D communication. In the examples herein, a wireless communication device detects another nearby wireless communication device by receiving a reference signal transmitted by the other wireless communication device. After detection, the wireless communication device may attempt to initiate a D2D communication link 202.

The scheduler 212 allocates time-frequency resources for communication between the base station 202 and the wireless communication devices 204, 206. In addition, the controller 208, scheduler 212, and/or the base station 202 schedules sounding reference signals (SRS) on the uplink. In the examples discussed herein, the scheduler 212 also allocates (schedules) time-frequency resources for transmission of D2D reference signals such as D2D SRS from the wireless communication UE devices 204, 206 to establish and/or maintain the device-to-device (D2D) communication link 201. The D2D SRS transmissions are used for device detection/discovery, signal acquisition (reception), channel estimation, and determining CSI. Examples of such techniques are described in PCT patent application serial number PCT/US2012/84712, filed on Nov. 12, 2012, and incorporated by reference in its entirety herein. In the examples herein, therefore, wireless communication devices detect/discover other wireless communication devices in their vicinity by transmitting and receiving D2D SRS signals. The D2D SRS signals are examples of the reference signal 106 discussed above.

Therefore, when the acknowledgment techniques discussed herein are applied to a D2D system such as the system of FIG. 2, the second UE device sends a D2D communication signal to the first wireless communication device using D2D communication resources assigned by the base station. The first UE device 202 periodically sends SRS signals where one or more of the SRS signals are coded or scrambled to indicate an acknowledgement response (either ACK or NACK) to the D2D communication signal. The second UE device 204 receives the SRS and attempts to decode them at least using an ACK descrambling code based on the ACK code and a NACK scrambling code based on the HACK code. In some circumstances, the second UE device 204 also attempts to decode the reference signal using a scrambling code based on only the device ID of the first UE device.

Figure 3:
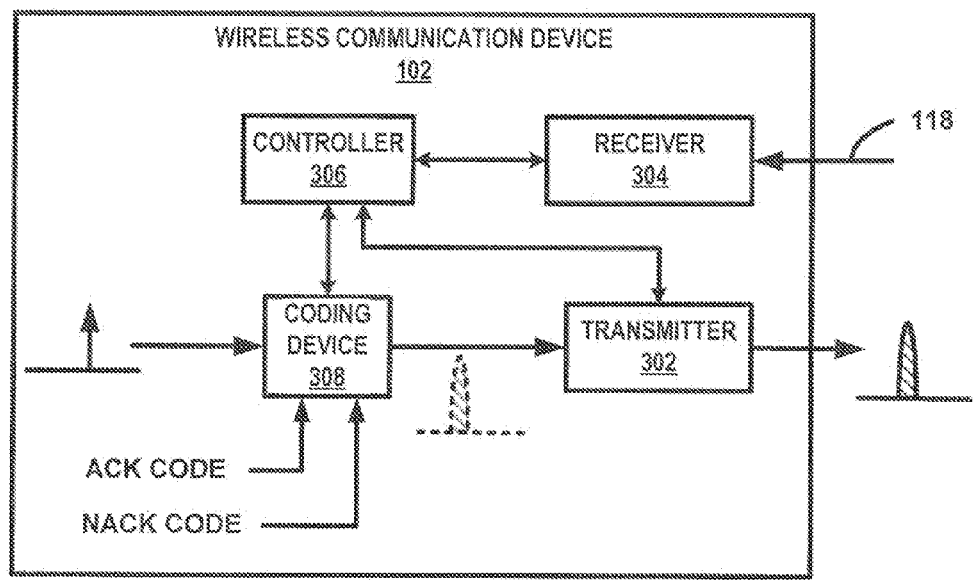
FIG. 3 is a block diagram of an example of the first wireless communication device.

FIG. 3 is a block diagram of an example of the first wireless communication device 102. The wireless communication device 102 includes at least a transmitter 302, receiver 304, controller 306 and a coding device 308. Two or more of the functional blocks of FIG. 3 may be integrated in a single device, and the functions described as performed in any single device may be implemented over several devices. For example, at least some of the functions of the coding device 308 may be performed by the controller 306 and vice versa. The wireless communication device 102 may also include other devices and circuits not shown in the Figures such as, for example, memory devices, and antennas. A transmitter 302 and receiver 304 include electronics for transmitting and receiving signals, respectively and may include any combination of hardware, software, and/or firmware. In most circumstances, the mobile wireless communication devices 102 also includes input and output devices such as, for example, visual displays, keyboards, touch screens, microphones and speakers (not shown).

The transmitter 302 is configured to transmit a reference signal 106 at a series of transmission times 108. The receiver 304 is configured to receive the communication signal 118 from another wireless communication device 104. The controller 308 is any processor, processor arrangement, logic circuitry, electrical circuit, arrangement of electronics, code, or combination thereof that performs the described functions as well as facilitating the overall operability of the wireless communication device 102. The controller is configured to determine that an acknowledgment response should be sent to the second device in response to the communication signal. In accordance with the particular system protocol and known techniques the controller processes incoming signals and determines when to send an ACK or a NACK to the second wireless communication device 104. The controller 308 instructs the appropriate circuits within the wireless communication device 102, including the coding device 308, to transmit the appropriate acknowledgment response. The coding device is configured to apply a code to the reference signal for at least one transmission time of the series of transmission times to generate a coded reference signal indicating the acknowledgment response. The coding device applies an ACK code for an ACK response and a NACK code for a NACK response. The transmitter then transmits the coded reference signal to the second wireless communication device 104.

Figure 4:
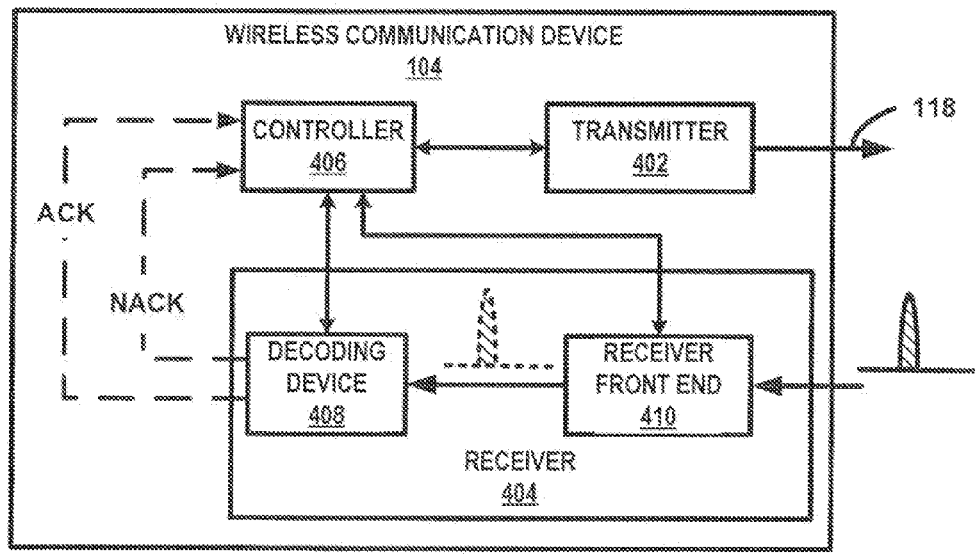
FIG. 4 is a block diagram of an example of the second wireless communication device.

FIG. 4 is a block diagram of an example of the second wireless communication device 104. The wireless communication device 104 includes at feast a transmitter 402, receiver 404, controller 406 and a decoding device 408. Two or more of the functional blocks of FIG. 4 may be integrated in a single device, and the functions described as performed in any single device may be implemented over several devices. For example, at least some of the functions of the decoding device 408 may be performed by the controller 406 and vice versa. The wireless communication device 104 may also include other devices and circuits not shown in the Figures such as, for example, memory devices and antennas. A transmitter 402 and receiver 304 include electronics for transmitting and receiving signals, respectively and may include any combination of hardware, software, and/or firmware, in most circumstances, the mobile wireless communication devices 104 also includes input and output devices such as, for example, visual displays, keyboards, touch screens, microphones and speakers (not shown). The second wireless communication device 104 may also include the functionality of the first wireless communication device 102 and vice versa.

The transmitter 402 is configured to transmit the communication signal 118. The second wireless communication device 104 is configured to defect an acknowledgment response sent from the first wireless communication device in response to the communication signal 118. The receiver 404 is configured to receive the plurality reference signals transmitted but the first wireless communication device 102.

As discussed above, the first wireless communication device transmits a reference signal 106 at a series of transmission times 108 to transmit a plurality of reference signals over time. The controller 406 is any processor, processor arrangement, logic circuitry, circuit, arrangement of electronics, code, or combination thereof that performs the described functions as well as facilitating the overall operability of the wireless communication device 104. The controller 406 is configured to determine that an acknowledgment response should be sent to the second device in response to the communication signal. In accordance with the particular system protocol and known techniques the controller 406 determines when to expect an ACK or a NACK from the first wireless communication device 102. The controller 406 instructs the appropriate circuits within the wireless communication device 104, including the decoding device 408, to receive and process the incoming reference signals. The decoding device 408 is configured to apply a code to the incoming reference signal received through a front end receiver 410 to determine which acknowledgment was sent. For the examples herein, the decoding device 408 applies the positive acknowledgment scrambling code (ACK scrambling code) to at least one reference signal of the plurality of reference signals and applies the negative acknowledgment scrambling code (NACK scrambling code) to the reference signal. Based on the results of decoding for each scrambling code, the controller determines which acknowledgment response was sent. In some circumstances, other circuits may fee used to identify the acknowledgment response. It is determined that a positive acknowledgment (ACK) was sent by the first wireless communication device when the reference signal is successfully descrambled by the positive acknowledgment scrambling code (ACK scrambling code). It is determined that a negative acknowledgment (NACK) was sent by the first wireless communication device when the reference signal is successfully descrambled by the negative acknowledgment scrambling code (NACK scrambling code). For one example, a correlator formed by a descrambler and an integrator provides an output signal that has a maximum output when the applied scrambling code matches the type of acknowledgment. An ACK correlator descrambles the incoming signal with the ACK scrambling code and the resulting signal is fed through an integrator. A NACK correlator descrambles the incoming signal with the NACK descrambling code and the resulting signal is fed through an integrator. The correlator with the maximum output indicates the type of acknowledgment response (ACK or NACK).

Figure 5A:
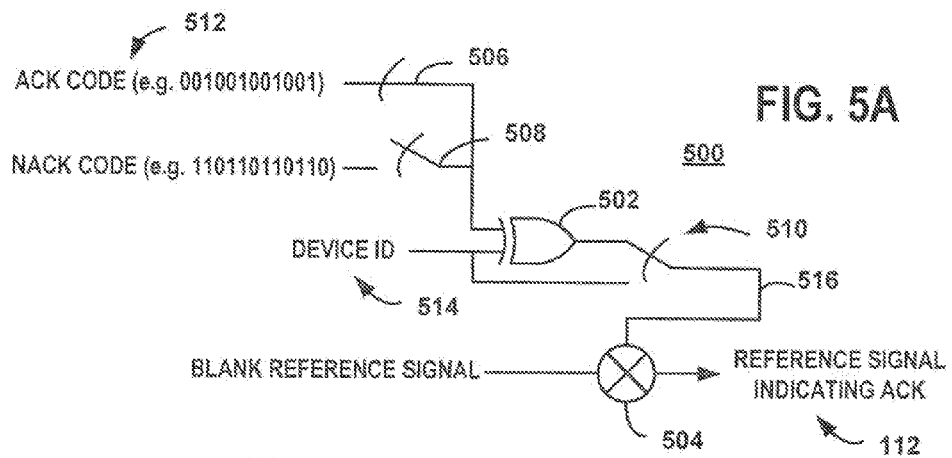
FIG. 5A is a diagram of an example of an exclusive-or (XOR) coding device in an ACK configuration.
Figure 5B:
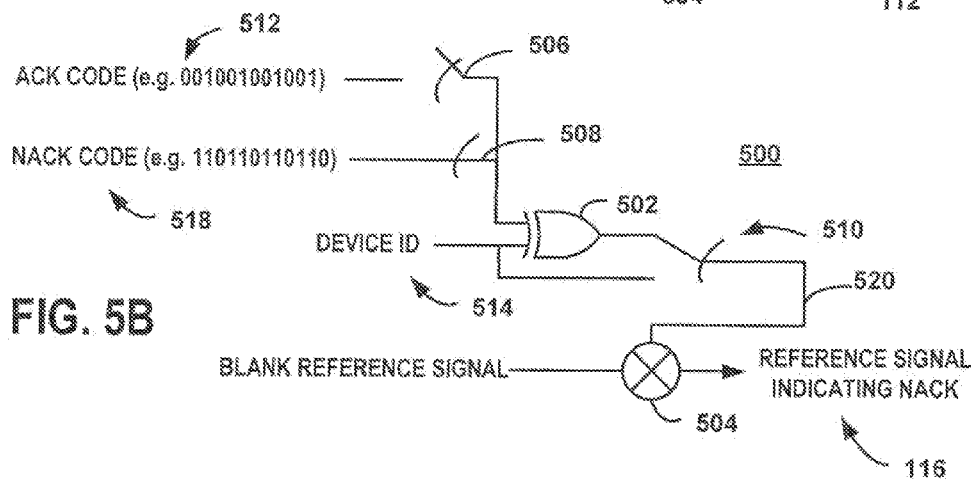
FIG. 5B is a diagram of an example of the exclusive-or (XOR) coding device in a NACK configuration.

FIG. 5A, FIG. 5B, and FIG. 5B are diagrams of an example exclusive-or (XOR) coding device 500 suitable for use as a coding device 308. The functions of the XOR coding device 500 can be implemented by any combination of circuits, logic gates, processors, code and devices. For the example, the XOR coding device 500 includes an exclusive-or (XOR) device 502 and a scrambling device 504 such as a mixer. Switches 506, 508, 510 are used to direct the appropriate signals to the XOR device 502 and scrambling device 504. In FIG. 5A, the first switch 506 is closed, the second switch 508 is open and the third switch is directed to the output of the XOR device. As a result, the XOR function is applied to the ACK code 512 and the device ID 514 of the first wireless communication device 102 to generate an ACK scrambling code 516. Although the ACK code and be any combination of symbols, the combination of symbols may be selected to maximize the ability of another device to successfully descramble the ACK reference signal. For the examples herein, the ACK code is "001001001001". Other codes can be used. The ACK scrambling code 516 is used to scramble a blank reference signal to generate a reference signal that indicates an ACK (ACK reference signal 112).

In FIG. 5B, the XOR coding device 500 is configured to generate the RACK reference signal 116. For this configuration, the first switch 506 is open and the second switch is closed. The third switch 510 selects the XOR device output, As a result, the XOR function is applied to the NACK code 518 and the device ID 514 to generate the NACK scrambling code 522. Although the NACK code and be any combination of symbols, the combination of symbols may be selected to maximize the ability of another device to successfully descramble the NACK reference signal. For the examples herein, the ACK code is "110110110110". Other codes can be used. The NACK scrambling code 520 is mixed with the blank reference signal to generate the NACK reference signal.

Figure 5C:
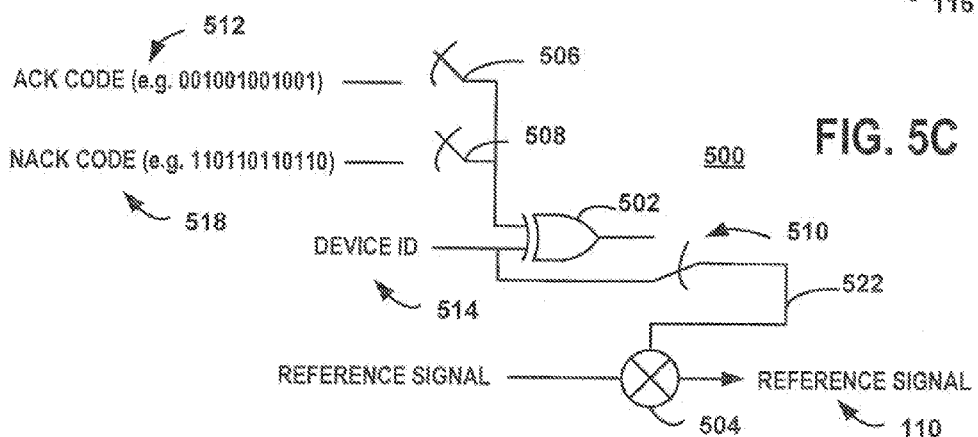
FIG. 5C is a diagram of an example of the exclusive-or (XOR) coding device in configuration for coding a reference signal without an acknowledgement response.

In FIG. 5C, the XOR coding device 500 is configured to generate a reference signal without an acknowledgement response. The first and second switches 506, 508 are open and the third switch directs the device ID to the scrambling device 504. As a result, the blank reference signal is scrambled with the device ID to generate reference signal such as reference signal 110.

Figure 6:
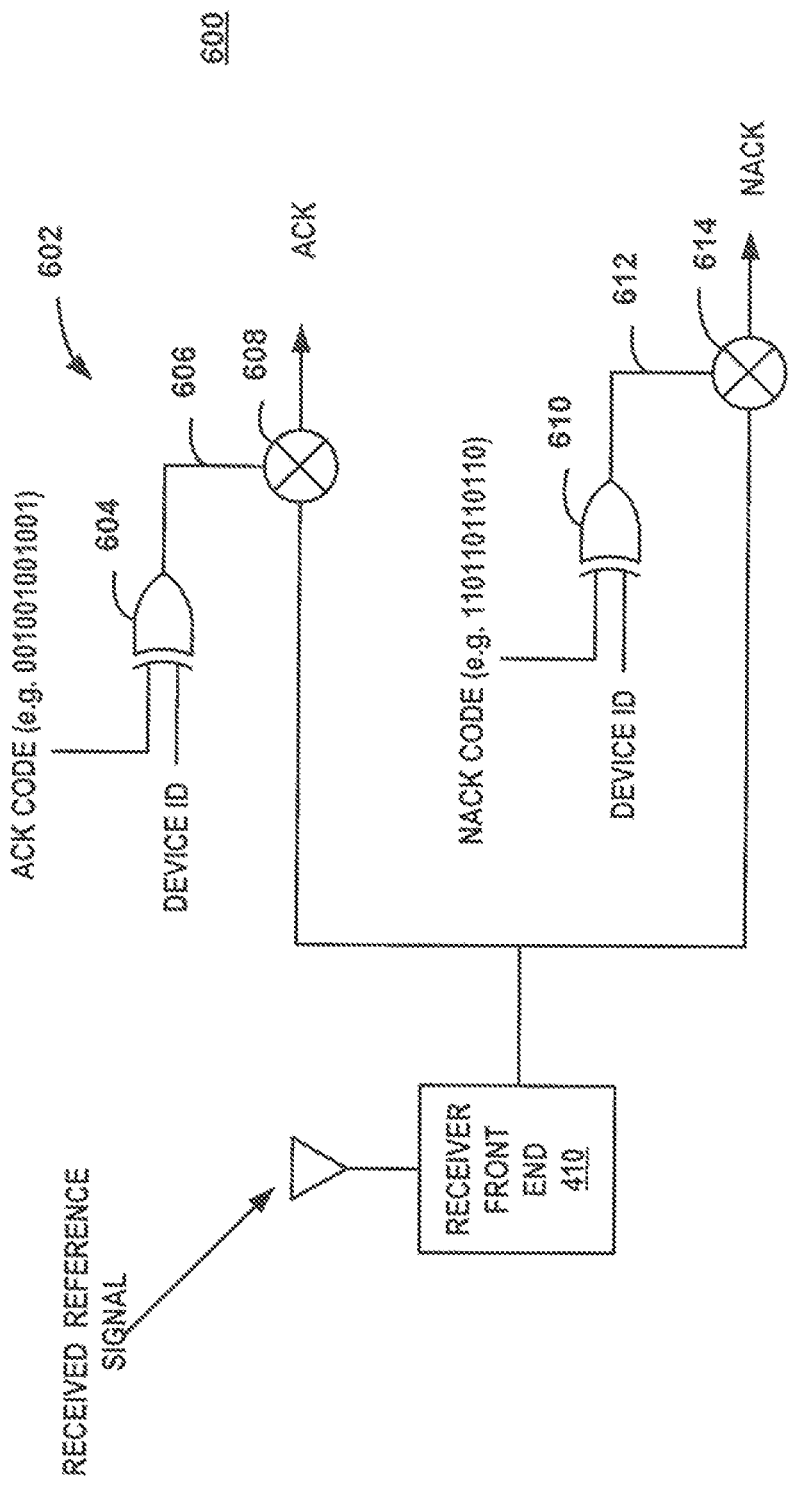
FIG. 6 is a diagram of a receiver suitable for use as the receiver in the second wireless communication device.

FIG. 6 is a diagram of a receiver 600 suitable for use as the receiver 404 in the second wireless communication device 104. The receiver 600 includes a front end receiver 410 that performs front end processing and any intermediate processing of the incoming reference signal to provide a digital signal to the decoder 602. The decoder 602 simultaneously descrambles the signal with the ACK scrambling code and the NACK scrambling code to determine which acknowledgment response was sent in some situations, the receiver 600 may also use a descrambling code based only on the device ID to receive the reference signal if no acknowledgement response was sent. The XOR function is applied to the ACK code and the device ID by a first XOR device 604. The resulting ACK scrambling code 606 is multiplied with the incoming digital signal by the mixer (multiplier) 608. If an ACK was sent, the reference signal will be successfully received. The XOR function is applied to the NACK code and the device ID by a second XOR device 610. The resulting NACK scrambling code 612 is multiplied with the incoming digital signal by the mixer (multiplier) 614. If a NACK was sent, the reference signal will be successfully received. As described above, a descrambler such as multiplier and an integrator can form a correlator with provides a maximum output when the matching type of code is used to descramble the incoming signal. Other receivers can be used to determine the type of acknowledgment.

Figure 7:
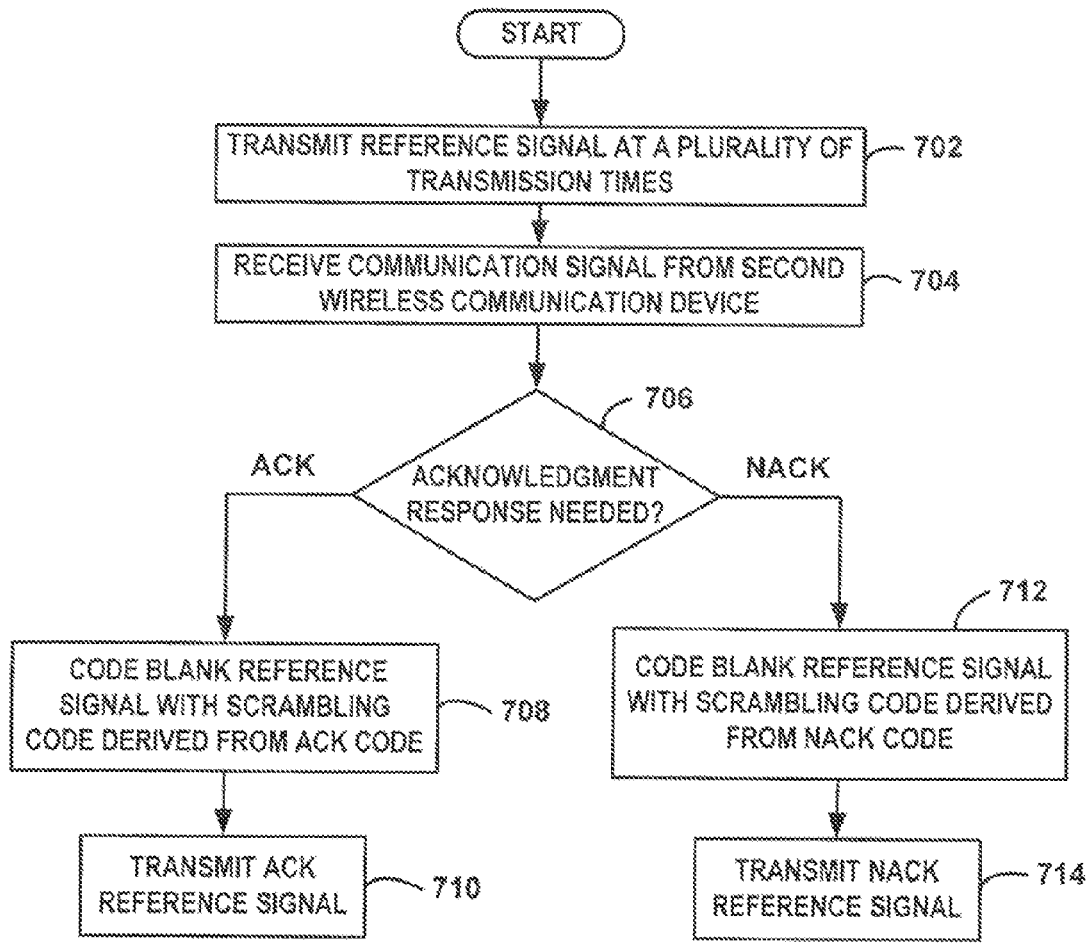
FIG. 7 is flow chart of method performed in a wireless communication device generating a reference signal acknowledgement response.

FIG. 7 is flow chart of method performed in a wireless communication device generating a reference signal acknowledgement response.

At step 702, a reference signal is transmitted at a series of transmission times. The wireless communication device is continually transmitting reference signals and step 702 continues while the method is performed.

At step 704, a communication signal is received from a second device.

At step 706, if is determined whether an acknowledgment response should be sent and what the acknowledgment response should indicate. If a positive acknowledgment response (ACK) should be sent the method continues at step 708. If a negative acknowledgment response (NACK) should be sent, the method continues at step 712. Steps 708 and 712 result in applying a code to the reference signal for at least one transmission time of the series of transmission times to generate at least one coded reference signal indicating an acknowledgment response.

At step 708, an ACK scrambling code derived from the ACK code is used to code a blank reference signal. In one example, and XOR function is applied to the ACK code and the device ID to generate the ACK scrambling code. The ACK scrambling code is then mixed with the blank reference signal to generate the ACK reference signal.

At step 710, the ACK reference signal is transmitted to the second wireless communication device. The ACK reference signal indicates an ACK.

At step 712, a NACK scrambling code derived from the HACK code is used to code a blank reference signal, in one example, and XOR function is applied to the NACK code and the device ID to generate the NACK scrambling code. The NACK scrambling code is then mixed with the blank reference signal to generate the ACK reference signal.

At step 714, the NACK reference signal is transmitted to the second wireless communication device. The NACK reference signal indicates a NACK.

In situations where no acknowledgment response is required, the reference signal is generated by a scrambling code based on the device ID. Accordingly, a plurality of reference signals are transmitted over time where some of the reference signals include NACKs or ACKs.

Figure 8:
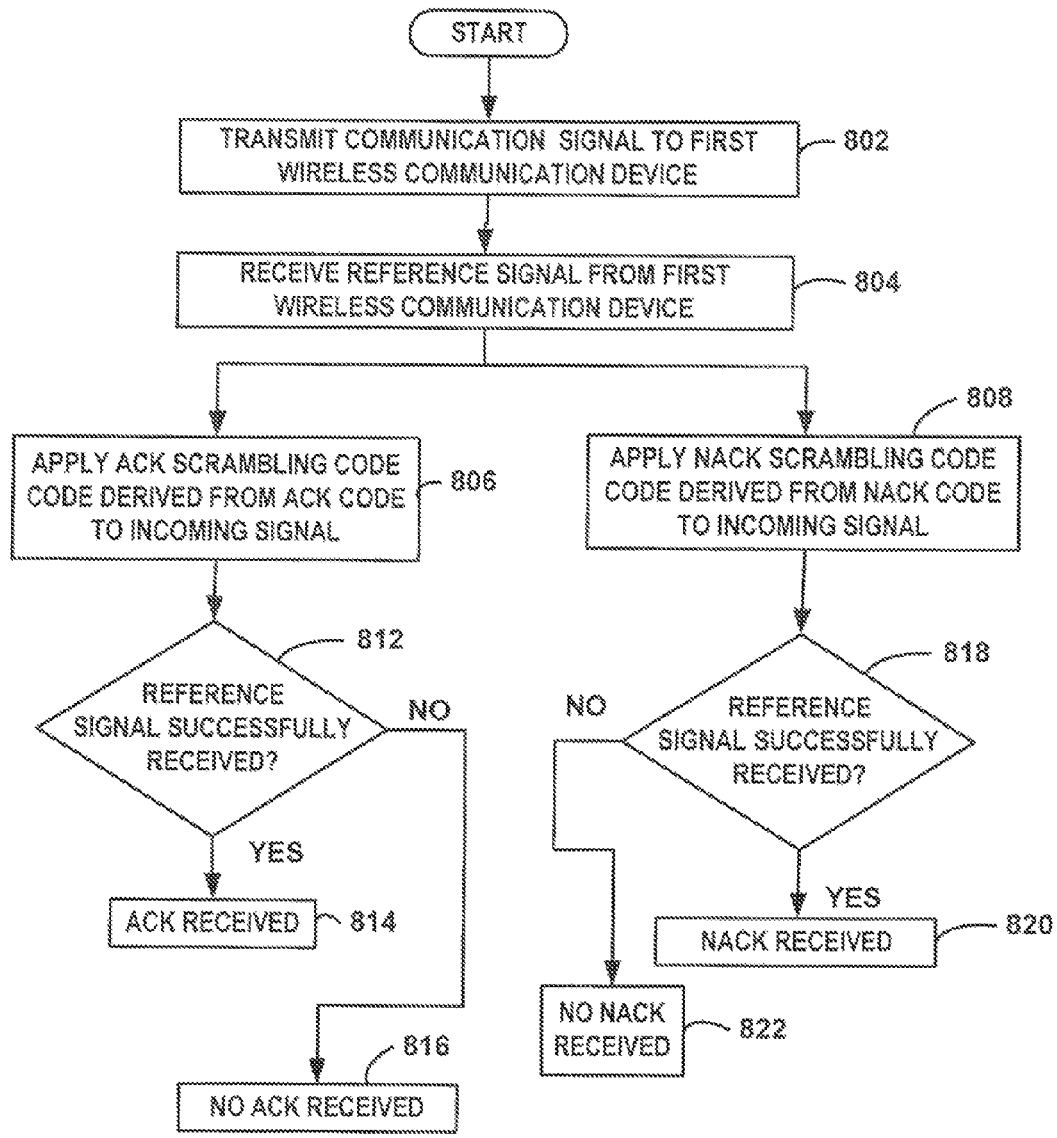
FIG. 8 is a flow chart of a method of receiving an acknowledgment reference signal at wireless communication device.

FIG. 8 is a flow chart of a method of receiving an acknowledgment reference signal at wireless communication device 104.

At step 802, a communication signal is sent to the first wireless communication device 102. The communication signal 118 requires an acknowledgment response from the first wireless communication device 102.

At step 804, a reference signal is received. As discussed above, the first wireless communication device 102 continually and periodically transmits a reference signal.

The method includes applying scrambling codes to the incoming reference signal where the scrambling codes are derived from the ACK code and the NACK code. For the examples herein, the scrambling codes are applied at the same time. As a result steps 806, 812 are performed at the same time as steps 808 and 818 in the example.

At step 806, the ACK scrambling code is applied to the incoming signal. The ACK scrambling code is derived from the device ID and the ACK code.

At step 812, it is determined whether the reference signal was successfully received by applying the ACK scrambling code. If the signal was successfully received the method continues at step 814 where it is determined that an ACK was received. Otherwise, the method continues at step 816 where it is determines than an ACK was not sent.

At step 808, the NACK scrambling code is applied to the incoming signal. The NACK scrambling code is derived from the device ID and the NACK code.

At step 818, it is determined whether the reference signal was successfully received by applying the NACK scrambling code. If the signal was successfully received the method continues at step 820 where it is determined that a NACK was received. Otherwise, the method continues at step 822 where it is determines than a NACK was not sent.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
transmitting, from a first device, a reference signal at a series of transmission times, wherein the first device is a first device-to-device (D2D) wireless communication device operating in a cellular communication system;
receiving a communication signal from a second device, wherein the second device is a second D2D wireless communication device operating in the cellular communication system and the communication signal is a D2D signal transmitted over D2D communication resources that are a subset of defined macrocell communication resources, the defined macrocell communication resources defined by a communication specification; and
in response to determining at the first device that an acknowledgment response should be sent to the second device in response to the communication signal, generating a response scrambling code by applying an exclusive-or (XOR) function to a response code and a device identifier (ID); and
scrambling the reference signal with the response scrambling code for at least one transmission time of the series of transmission times to generate at least one scrambled reference signal indicating an acknowledgment response.

2. The method of claim 1, wherein the acknowledgment response is a positive acknowledgment (ACK) response, and wherein the response code is a positive acknowledgement (ACK) response code.

3. The method of claim 1, wherein the acknowledgment response is a negative acknowledgment (NACK) response, and wherein is a negative acknowledgement (NACK) response code.

4. The method of claim 1, wherein:
to indicate a positive acknowledgment response to the second device, the response code is positive acknowledgment (ACK) response code and
to indicate a negative acknowledgment response to the second device, the response code is a negative acknowledgment (NACK) response code.

5. The method of claim 4, further comprising:
transmitting the reference signal without indicating the acknowledgment response during at least one other transmission time of the series of transmission times, the transmitting comprising scrambling the reference signal with the device ID without generating the response scrambling code.

6. A wireless communication device, comprising:
a transmitter configured to transmit a reference signal at a series of transmission times, wherein the wireless communication device is a first device-to-device (D2D) wireless communication device operating in a cellular communication system;
a receiver configured to receive a communication signal from another wireless communication device, wherein the another wireless communication device is a second D2D wireless communication device operating in the cellular communication system and the communication signal is a D2D signal transmitted over D2D communication resources that are a subset of defined macrocell communication resources, the defined macrocell communication resources defined by a communication specification;

a controller configured to determine that an acknowledgment response should be sent to the second device in response to the communication signal;

a coding device configured to generate a response scrambling code by applying an exclusive-or (XOR) function to a response code and a device identifier (ID); and a scrambling device configured to scramble the reference signal with the response scrambling code for at least one transmission time of the series of transmission times to generate at least one scrambled reference signal indicating an acknowledgment response, the transmitter configured to transmit the at least one scrambled reference signal to the another wireless communication device.

7. The wireless communication device of claim 6, wherein the acknowledgment response is a positive acknowledgment (ACK) response, and wherein the response code is a positive acknowledgement (ACK) response code.

8. The wireless communication device of claim 6, wherein the acknowledgment response is a negative acknowledgment (NACK) response, and wherein the response code is a negative acknowledgement (NACK) response code.

9. The wireless communication device of claim 6, wherein:
to indicate a positive acknowledgment response to the second device, the response code a positive acknowledgment (ACK) response code and
to indicate a negative acknowledgment response to the second device, the response code is a negative acknowledgment (NACK) response code.

10. The wireless communication device of claim 9, wherein the transmitter transmits the reference signal without indicating the acknowledgment response by scrambling the reference signal with the device ID without generating the response scrambling code.

11. A method of detecting an acknowledgment response sent from a first wireless communication device to a second wireless communication device, wherein the first wireless communication device is a first device-to-device (D2D) wireless communication device operating in a cellular communication system and the second wireless communication device is a second D2D wireless communication device operating in the cellular communication system, the method performed in the second wireless communication device, the method comprising:

transmitting a communication signal from the second wireless communication device to the first wireless communication device, wherein the communication signal is a D2D signal transmitted over D2D communication resources that are a subset of defined macrocell communication resources, the defined macrocell communication resources defined by a communication specification, the communication signal requiring an acknowledgment response from the first wireless communication device, the first wireless communication device transmitting a reference signal at a series of transmission times to transmit a plurality of reference signals over time;

applying an exclusive-or (XOR) function to a positive acknowledgment code and a device identifier (ID) to generate a positive acknowledgement descrambling code;

applying the positive acknowledgment descrambling code to at least one reference signal of the plurality of reference signals;

applying the exclusive-or (XOR) function to a negative acknowledgment code and the device identifier (ID) to generate a negative acknowledgement descrambling code;

applying the negative acknowledgment descrambling code to the at least one reference signal; and determining that a positive acknowledgment was sent by the first wireless communication device when the at least one reference signal is successfully descrambled by the positive acknowledgment descrambling code; and determining that a negative acknowledgment was sent by the first wireless communication device when the at least one reference signal is successfully descrambled by the negative acknowledgment descrambling code.

12. The method of claim 11, further comprising:
applying the device ID as a descrambling code to the plurality of reference signals.

* * * * *